(12) United States Patent
Tetsumoto et al.

(10) Patent No.: US 8,999,033 B2
(45) Date of Patent: Apr. 7, 2015

(54) METHOD AND SYSTEM FOR PRODUCING DIRECT REDUCED IRON AND/OR HOT METAL USING BROWN COAL

(75) Inventors: Masahiko Tetsumoto, Charlotte, NC (US); Todd Astoria, Harrisburg, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 702 days.

(21) Appl. No.: 13/325,890

(22) Filed: Dec. 14, 2011

(65) Prior Publication Data

US 2012/0152061 A1 Jun. 21, 2012

Related U.S. Application Data

(63) Continuation-in-part of application No. 13/305,876, filed on Nov. 29, 2011.

(60) Provisional application No. 61/423,173, filed on Dec. 15, 2010.

(51) Int. Cl.
*C22B 5/00* (2006.01)
*C22B 1/16* (2006.01)
*C21B 13/00* (2006.01)

(52) U.S. Cl.
CPC .............. *C21B 13/0066* (2013.01); *C22B 5/00* (2013.01); *C22B 1/16* (2013.01); *C21B 13/0046* (2013.01); *C21C 2100/06* (2013.01)

(58) Field of Classification Search
CPC ........ C22B 1/16; C22B 5/00; C21B 13/0046; C21B 13/0066

USPC ........... 75/771, 504, 958; 266/168, 171, 144, 266/160, 156

See application file for complete search history.

(56) References Cited

U.S. PATENT DOCUMENTS

| | | | | |
|---|---|---|---|---|
| 4,497,661 | A * | 2/1985 | Valenti | 75/317 |
| 4,531,973 | A * | 7/1985 | Nixon | 75/10.41 |
| 4,627,575 | A * | 12/1986 | Johns et al. | 241/15 |
| 5,066,325 | A * | 11/1991 | Lehto | 75/499 |
| 5,514,203 | A | 5/1996 | Grunbacher et al. | |
| 5,567,224 | A * | 10/1996 | Kundrat | 75/414 |
| 6,592,646 | B2 * | 7/2003 | Shigehisa et al. | 75/492 |
| 8,579,999 | B2 * | 11/2013 | Bullinger et al. | 44/626 |

FOREIGN PATENT DOCUMENTS

| | | | | |
|---|---|---|---|---|
| AU | 2007100781 | A4 * | 9/2007 | C22B 1/245 |
| EP | 2270239 | A1 | 5/2011 | |
| WO | WO2009131148 | A1 | 10/2009 | |

* cited by examiner

*Primary Examiner* — George Wyszomierski
*Assistant Examiner* — Tima M McGuthry Banks
(74) *Attorney, Agent, or Firm* — Clements Bernard PLLC; Christopher L. Bernard; Lawrence A. Baratta, Jr.

(57) ABSTRACT

The present invention provides a method for producing direct reduced iron and/or hot metal using high-moisture content carbonaceous material, including: agglomerating carbonaceous material from the high-moisture content carbonaceous material with a metal oxide-bearing material to form an agglomerate suitable for use in a direct reduction and/or hot metal producing process. The method also includes distilling the high-moisture content carbonaceous material. The method further includes dry quenching the carbonaceous material obtained from the distilling step. The method still further includes drying the high-moisture content carbonaceous material with energy from a hot off gas from a furnace for producing direct reduced iron and/or hot metal prior to the distilling step.

10 Claims, 1 Drawing Sheet

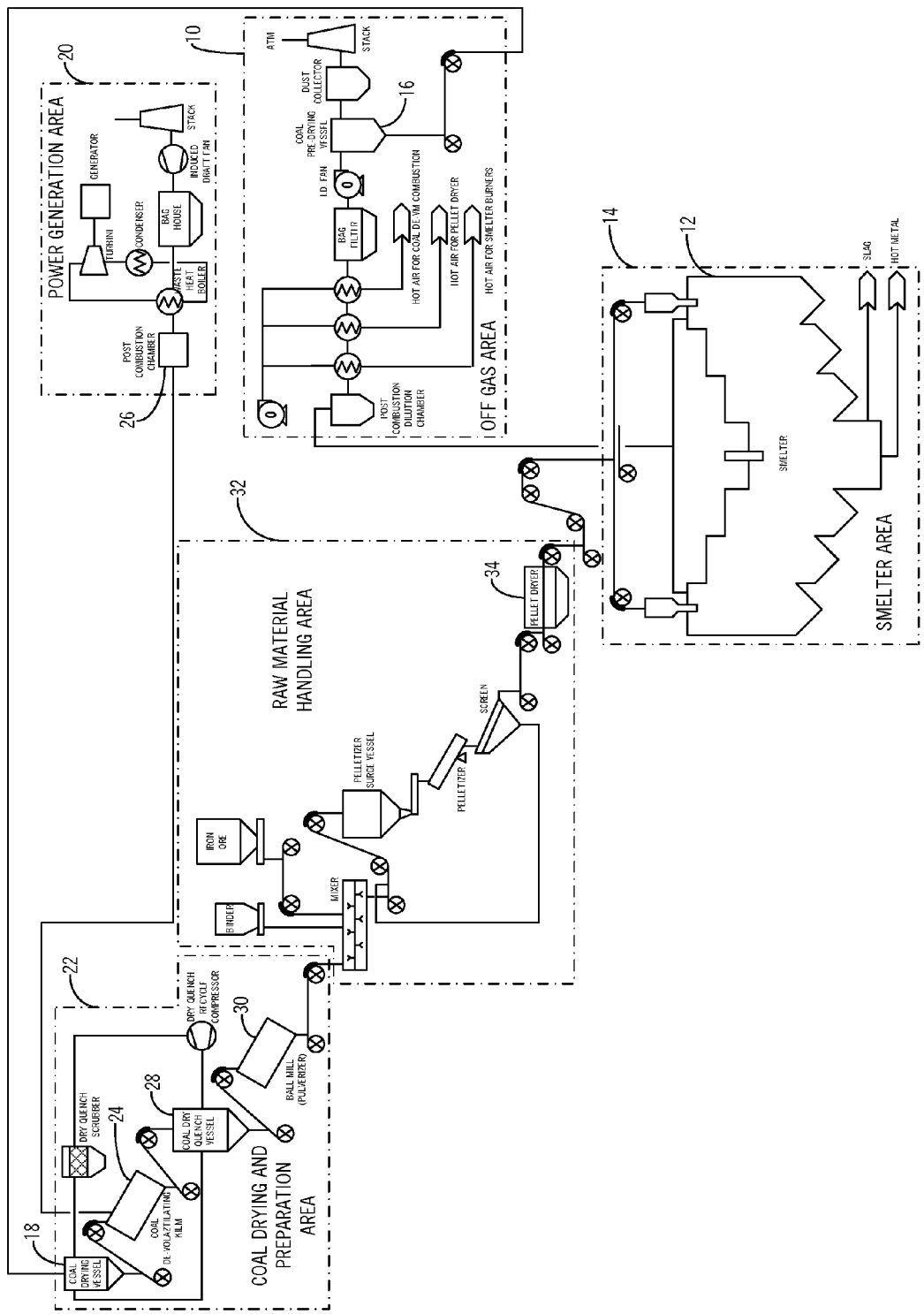

METHOD AND SYSTEM FOR PRODUCING DIRECT REDUCED IRON AND/OR HOT METAL USING BROWN COAL

CROSS-REFERENCE TO RELATED APPLICATION(S)

The present patent application/patent claims the benefit of priority of U.S. Provisional Patent Application No. 61/423,173, filed on Dec. 15, 2010, and entitled "METHOD AND SYSTEM FOR PRODUCING DIRECT REDUCED IRON AND/OR HOT METAL USING BROWN COAL," the contents of which are incorporated in full by reference herein. The present patent application/patent is also a continuation-in-part of co-pending U.S. patent application Ser. No. 13/305,876 (now U.S. Pat. No. 8,871,000), filed on Nov. 29, 2011, and entitled "ELECTRIC FURNACE FOR PRODUCING MOLTEN METAL HAVING MATERIAL RECYCLING CAPABILITY," the contents of which are also incorporated in full by reference herein.

FIELD OF THE INVENTION

The present invention relates generally to a method and system for producing direct reduced iron (DRI) and/or hot metal using brown coal, i.e. lignite and sub-bituminous coal, for example. Advantageously, this method and system may be used to generate power with high efficiency, and the DRI and/or hot metal may be used to accumulate energy and are easily transportable.

BACKGROUND OF THE INVENTION

Lignite has a total carbon content of about 25-35%, a moisture content that is sometimes as high as about 66%, an ash content of about 6-19%, and a heat content ranging from about 10-20 MJ/kg (i.e. about 9-17 million Btu per short ton) on a dry ash-free (DAF) basis. For comparison, bituminous coal has a total carbon content of about 60-80%, an ash content of about 6-12%, and a calorific value of about 24-35 MJ/kg on a DAF basis. Sub-bituminous coals have total carbon contents, ash contents, and heating values between lignite and bituminous coals, and contain on the order of 15-30% moisture. It should be noted that all of these content ranges are exemplary only, and non-limiting (as used throughout this Specification). Lignite has a high content of volatile matter, which makes it easier to convert into gas and liquid petroleum products than other higher-ranking coals. However, lignite's high moisture content and susceptibility to spontaneous combustion may cause difficulties in transportation and storage.

Because of its low energy density, lignite is inefficient to transport and is not traded extensively in world markets as compared to other higher-ranking coals. Lignite is often used for fuel in power stations that are constructed close to a coal mine. Australia's Latrobe Valley and Luminant's Monticello plant in Texas are examples of lignite-burning power plants that are located close to a coal mine.

Lignite does not have enough strength to be used in a blast furnace as coke, even if the lignite is devolatilized. Lignite has less fixed carbon, which makes it difficult to use in direct reduction (DR) and other iron-making processes as the carbonaceous material that is agglomerated with an iron oxide containing material.

Sub-bituminous coal is similar to lignite and has a typical moisture content of about 20-30%. The high moisture content of the sub-bituminous coal also causes its energy density to be lower than other higher-ranking coals. Further, sub-bituminous coal does not have enough strength to be used in a blast furnace as coke, even if it is devolatilized.

Thus, conventional methods and systems for producing DRI and/or hot metal typically use coke or high-grade coal, and lignite (i.e. brown coal), sub-bituminous coal, and the like are not used. Lignite is used only for local, low-efficiency power generation. The low efficiency of this power generation results from the fact that part of the energy of the coal must be used to vaporize the moisture in order to dry the lignite and sub-bituminous coal.

BRIEF SUMMARY OF THE INVENTION

In accordance with the methods and systems of the present invention, however, power can be generated and DRI and/or hot metal can be produced effectively and efficiently using lignite, sub-bituminous coal, and the like. Energy accumulation and easy transportation are thereby enabled.

In one exemplary embodiment, the present invention provides a method for producing direct reduced iron and/or hot metal using high-moisture content carbonaceous material, including: agglomerating carbonaceous material from the high-moisture content carbonaceous material with a metal oxide-bearing material to form an agglomerate suitable for use in a direct reduction and/or hot metal producing process. The method also includes distilling the high-moisture content carbonaceous material. The method further includes dry quenching the carbonaceous material obtained from the distilling step. The method still further includes drying the high-moisture content carbonaceous material with energy from a hot off gas from a furnace for producing direct reduced iron and/or hot metal prior to the distilling step. Optionally, the method includes drying the high-moisture content carbonaceous material directly with the hot off gas from the furnace for producing direct reduced iron and/or hot metal. Optionally, the method includes drying the high-moisture content carbonaceous material indirectly with the hot off gas from the furnace for producing direct reduced iron and/or hot metal. Optionally, the method includes drying the high-moisture content carbonaceous material with low-oxygen content gas prior to the distilling step. Optionally, the method includes drying the high-moisture content carbonaceous material with off gas from a power generation facility prior to the distilling step. The method still further includes generating power with a portion of the high-moisture content carbonaceous material. The method still further includes recycling low-oxygen content gas prior to the agglomerating step. Preferably, the high-moisture content carbonaceous material includes one of brown coal, lignite, and sub-bituminous coal. Preferably, the high-moisture content carbonaceous material includes at least 20% moisture. Optionally, the method still further includes using a gasified portion of the high-moisture content carbonaceous material from the distilling step for generating power and using a residual portion of the high-moisture content carbonaceous material as reductant in the direct reduction and/or hot metal producing process. Optionally, the direct reduction and/or hot metal producing process includes one using a reduction and/or melting furnace for producing molten metal from the agglomerates including one or more openings disposed in a bottom portion of the furnace for selectively removing a portion of a raw material from the furnace such that a raw material bed or layer has predetermined characteristics over time. Optionally, the direct reduction and/or hot metal producing process includes using a reduction and/or melting furnace for producing molten metal from the agglomerates while feeding an oxygen-containing gas from a secondary combustion burner into a furnace interior, thereby causing combustion of carbon monoxide-containing gas generated from an agglomerate layer, and using the radiant heat there from to effect heating reduction of the agglomerate layer.

In another exemplary embodiment, the present invention provides a system for producing direct reduced iron and/or hot metal using high-moisture content carbonaceous material, including: means for agglomerating carbonaceous material from the high-moisture content carbonaceous material with a metal oxide-bearing material to form an agglomerate suitable for use in a direct reduction and/or hot metal producing process. The system also includes means for distilling the high-moisture content carbonaceous material. The system further includes means for dry quenching the carbonaceous material obtained from the distilling step. The system still further includes means for drying the high-moisture content carbonaceous material with energy from a hot off gas from a furnace for producing direct reduced iron and/or hot metal prior to the distilling step. Optionally, the system includes means for drying the high-moisture content carbonaceous material directly with the hot off gas from the furnace for producing direct reduced iron and/or hot metal. Optionally, the system includes means for drying the high-moisture content carbonaceous material indirectly with the hot off gas from the furnace for producing direct reduced iron and/or hot metal. Optionally, the system includes means for drying the high-moisture content carbonaceous material with low-oxygen content gas prior to the distilling step. Optionally, the system includes means for drying the high-moisture content carbonaceous material with off gas from a power generation facility prior to the distilling step. The system still further includes means for generating power with a portion of the high-moisture content carbonaceous material. The system still further includes means for recycling low-oxygen content gas prior to the agglomerating step. Preferably, the high-moisture content carbonaceous material includes one of brown coal, lignite, and sub-bituminous coal. Preferably, the high-moisture content carbonaceous material includes at least 20% moisture. Optionally, the system still further includes means for using a gasified portion of the high-moisture content carbonaceous material from the distilling step for generating power and using a residual portion of the high-moisture content carbonaceous material as reductant in the direct reduction and/or hot metal producing process. Optionally, the direct reduction and/or hot metal producing process includes one using a reduction and/or melting furnace for producing molten metal from the agglomerates including one or more openings disposed in a bottom portion of the furnace for selectively removing a portion of a raw material from the furnace such that a raw material bed or layer has predetermined characteristics over time. Optionally, the direct reduction and/or hot metal producing process includes using a reduction and/or melting furnace for producing molten metal from the agglomerates while feeding an oxygen-containing gas from a secondary combustion burner into a furnace interior, thereby causing combustion of carbon monoxide-containing gas generated from an agglomerate layer, and using the radiant heat there from to effect heating reduction of the agglomerate layer.

In a further exemplary embodiment, the present invention provides a method for producing direct reduced iron and/or hot metal using lignite, sub-bituminous coal, or the like, including: drying the lignite or sub-bituminous coal with energy from a hot off gas from a furnace for producing direct reduced iron and/or hot metal; optionally, drying the lignite or sub-bituminous coal with low-oxygen-content gas; distilling the lignite or sub-bituminous coal; dry quenching carbonaceous material from the distilling step; and agglomerating the carbonaceous material with a metal oxide-bearing material to form an agglomerate suitable for use in a direct reduction and/or hot metal producing process. Optionally, the method further includes drying the lignite or sub-bituminous coal directly with the hot off gas from the furnace for producing direct reduced iron and/or hot metal. Optionally, the method further includes drying the lignite or sub-bituminous coal indirectly with the hot off gas from the furnace for producing direct reduced iron and/or hot metal. The method still further includes recycling low-oxygen-content gas between the dry quenching and drying steps. Optionally, the method still further includes drying the lignite or sub-bituminous coal with off gas from a power generation facility.

In a still further exemplary embodiment, the present invention provides a system for producing direct reduced iron and/or hot metal using lignite, sub-bituminous coal, or the like, including: means for drying the lignite or sub-bituminous coal with energy from a hot off gas from a furnace for producing direct reduced iron and/or hot metal; optionally, means for drying the lignite or sub-bituminous coal with low-oxygen-content gas; means for distilling the lignite or sub-bituminous coal; means for dry quenching carbonaceous material from the distilling step; and means for agglomerating the carbonaceous material with a metal oxide-bearing material to form an agglomerate suitable for use in a direct reduction and/or hot metal producing process. Optionally, the system further includes means for drying the lignite or sub-bituminous coal directly with the hot off gas from the furnace for producing direct reduced iron and/or hot metal. Optionally, the system further includes means for drying the lignite or sub-bituminous coal indirectly with the hot off gas from the furnace for producing direct reduced iron and/or hot metal. The system still further includes means for recycling low-oxygen-content gas between the dry quenching and drying steps. Optionally, the system still further includes means for drying the lignite or sub-bituminous coal with off gas from a power generation facility.

In a still further exemplary embodiment, the present invention provides a method for producing direct reduced iron and/or hot metal using lignite, sub-bituminous coal, or the like, including: drying the lignite or sub-bituminous coal with energy from a hot off gas from a furnace for producing direct reduced iron and/or hot metal; optionally, drying the lignite or sub-bituminous coal with low-oxygen-content gas; optionally, generating power with a portion of the lignite or sub-bituminous coal; producing a carbonaceous material with a portion of the lignite or sub-bituminous coal; and agglomerating the carbonaceous material with a metal oxide-bearing material to form an agglomerate suitable for use in a direct reduction and/or hot metal producing process. The method also includes distilling at least a portion of the lignite or sub-bituminous coal; and dry quenching carbonaceous material from the distilling step. Optionally, the method further includes drying the lignite or sub-bituminous coal directly with the hot off gas from the furnace for producing direct reduced iron and/or hot metal. Optionally, the method further includes drying the lignite or sub-bituminous coal indirectly with the hot off gas from the furnace for producing direct reduced iron and/or hot metal. The method still further includes recycling low-oxygen-content gas between the dry quenching and drying steps. The method still further includes drying the lignite or sub-bituminous coal with off gas from a power generation facility.

In a still further exemplary embodiment, the present invention provides a method for producing direct reduced iron and/or hot metal using high-moisture content carbonaceous material, including: drying the high-moisture content carbonaceous material with energy from a hot off gas from a furnace for producing direct reduced iron and/or hot metal; optionally, generating power with a portion of the high-moisture content carbonaceous material; producing a carbonaceous material with a portion of the high-moisture content carbonaceous material; and agglomerating the carbonaceous material with a metal oxide-bearing material to form an agglomerate suitable for use in a direct reduction and/or hot metal producing process. The high-moisture content carbonaceous material includes at least about 20% moisture. The method also includes distilling at least a portion of the high-moisture content carbonaceous material; and dry quenching carbonaceous material from the distilling step. Optionally, the method includes drying the high-moisture content carbonaceous material directly with the hot off gas from the furnace for producing direct reduced iron and/or hot metal. Optionally, the method includes drying the high-moisture content carbonaceous material indirectly with the hot off gas from the furnace for producing direct reduced iron and/or hot metal. Optionally, the method further includes drying the high-moisture content carbonaceous material with off gas from a power generation facility.

In a still further exemplary embodiment, the present invention provides a method for producing direct reduced iron and/or hot metal using lignite, sub-bituminous coal, or the like, including: distilling the lignite or sub-bituminous coal; dry quenching carbonaceous material from the distilling step; and agglomerating the carbonaceous material with a metal oxide-bearing material to form an agglomerate suitable for use in a direct reduction and/or hot metal producing process. The method also includes drying the lignite or sub-bituminous coal with energy from a hot off gas from a furnace for producing direct reduced iron and/or hot metal. Optionally, the method further includes drying the lignite or sub-bituminous coal with low-oxygen-content gas. Optionally, the method still further includes drying the lignite or sub-bituminous coal directly with the hot off gas from the furnace for producing direct reduced iron and/or hot metal. Optionally, the method still further includes drying the lignite or sub-bituminous coal indirectly with the hot off gas from the furnace for producing direct reduced iron and/or hot metal. The method still further includes recycling low-oxygen-content gas between the dry quenching and drying steps. Optionally, the method still further includes drying the lignite or sub-bituminous coal with off gas from a power generation facility.

BRIEF DESCRIPTION OF THE DRAWINGS

The present invention is illustrated and described herein, in non-limiting embodiments, with reference to the various drawings, in which like reference numbers are used to denote like method steps/system components, as appropriate, and in which:

FIG. 1 is a schematic diagram illustrating one exemplary embodiment of the brown coal DRI/hot metal production system of the present invention.

DETAILED DESCRIPTION OF THE INVENTION

In an off gas area 10, the lignite, sub-bituminous coal, or the like is first pre-dried to a predetermined moisture content, while avoiding auto-ignition, by using energy from the hot off gas from a heating, reducing, and/or melting furnace, such as a kiln, reducing-heating furnace (RHF), and/or smelter furnace 12 located in a smelter area 14 or the like. This process is carried out in a coal pre-drying vessel 16. The energy from the hot off gas may be used either directly (i.e. the hot off gas contacts the coal) or indirectly (i.e. the hot off gas is separated from the coal by a heat transfer surface and/or other suitable heat transfer medium). For the direct-drying method, the coal is contacted with the hot off gas (e.g. in a shaft furnace-type vessel, such as a vessel similar to that used in the MIDREX® Process, via fluidized beds, via conveyor-type dryer, etc.). However, the hot off gas might contain enough oxygen to cause problems due to combustion of the coal if the coal is dried too much. In this case, indirect drying of the coal may be applied using an appropriate equipment design (e.g. in a vessel or kiln where the flue gas flows in tubes and the coal remains on the shell side of the equipment, etc.). In this indirect-drying case, the coal may be maintained in a low-oxygen-content atmosphere, and the energy from the hot off gas may still be used to pre-dry the coal. One possible problem is with material handling of partially-dried lignite or sub-bituminous coal. If combustion or bulk material handling problems of partially-dried lignite or sub-bituminous coal occur, then the pre-drying step may be eliminated, and another indirect drying method may be applied. In this case, all of the drying may be completed in a unit operating under low-oxygen-content conditions (as described in the following paragraph). Low-oxygen-content gas is partially heated with energy from the hot off gas and recycled.

The pre-dried lignite, sub-bituminous coal, or the like is then fed to a second drying system 18 (e.g. a shaft furnace-type vessel, such as a vessel similar to that used in the MIDREX® Process, rotary kiln, fluidized beds, a conveyor-type dryer, etc.) which dries the lignite or sub-bituminous coal enough for high-efficiency power generation in the power generation area 20. This second drying system 18 is located in a coal drying and preparation area 22, for example. The lignite, sub-bituminous coal, or the like might be dried to below about 5% moisture. This power generation is highly efficient because waste heat from the heating, reducing, and/or melting furnace has been used to remove the moisture, so energy is not lost to the latent heat required to vaporize the water or to the sensible heat carried by the water vapor in the flue gas. Low-oxygen-content gas is used as the drying media in the second drying system 18 to avoid auto-ignition of the lignite or sub-bituminous coal. Alternatively, indirect drying with a kiln with a tube or the like may be used. In case it is not possible to pre-dry the lignite or sub-bituminous coal due to material handling issues, then this is the only coal drying unit operating.

The dried lignite or sub-bituminous coal from the second drying system 18 is fed to a destructive distillation facility 24, such as a rotary kiln and/or rotary hearth furnace. The volatilized and combustible gas from the destructive distillation facility 24 is combusted or fed to a post combustion chamber 26 and used to make hot gas or steam that is suitable for power generation.

Existing power plants that use lignite or sub-bituminous coal also have pre-drying systems that are heated by the power plant off gas. However, off gas from the power plant does not have enough energy to dry lignite or sub-bituminous coal properly, or the lignite or sub-bituminous coal may be dried properly at the expense of energy that could be used for power generation. So the power generation efficiency is low.

Next, hot carbonaceous material from the distillation facility 24 is fed to a dry quench system 28 (e.g. a shaft furnace-type vessel, such as a vessel similar to that used in the MIDREX® Process, rotary kiln, fluidized beds, a conveyor-type dryer, etc.) which cools the carbonaceous material so that it may be used in further processing steps. Low-oxygen-content gas is used to cool the hot carbonaceous material.

After cooling the distilled carbonaceous material, the hot low-oxygen-content gas is then used to dry lignite or sub-bituminous coal in the second drying system 18 that is mentioned above. The low-oxygen-content gas is then conditioned so that it may be recycled to the dry quench system 28.

High energy efficiency as a total system may be achieved because the present invention eliminates most of the moisture in the lignite or sub-bituminous coal using waste heat from the heating, reducing, and/or melting furnace 12 to recycle the energy removed from distilled carbonaceous material. The heat and material balance for the off gas, lignite or sub-bituminous coal drying area, and power generation area is advantageous.

Another advantage of the present invention is the utilization of a distilled carbonaceous material as the reductant to manufacture reduced metal and/or hot metal that may be processed to produce slab, billet, and/or bloom, etc. Distilled carbonaceous material has several advantages as compared to coal (especially the direct use of lignite or sub-bituminous coal) when used in the heating, reducing, and/or melting furnaces. Some of the advantages are a lower mixing ratio of carbonaceous material in the agglomerates, improved physical properties of green and reduced agglomerates, higher productivity of the heating, reducing, and/or melting furnace, and a lower chance of low-temperature corrosion in the off gas system due to lower hydrogen content.

The energy from the lignite or sub-bituminous coal is "stored" in the metal products and may be transported more easily than the lignite or sub-bituminous coal.

In accordance with the methods and systems of the present invention, devolatilized and cooled carbonaceous material is fed to a pulverizing system 30, such as a balling drum or hammer mill-type pulverizer. Then, the pulverized carbonaceous material is agglomerated with a metal oxide-bearing material such as, but not limited to, iron oxide, zinc oxide, nickel oxide, blast furnace dust, basic oxygen furnace dust, electric arc furnace dust, etc., in a raw material handling area 32. The agglomerates are dried (if required) in a pellet dryer 34, and then fed to the heating furnace 12 to be reduced and/or melted. The heating furnace 12 includes, but is not limited to, a rotary hearth furnace, an electric arc furnace (EAF), a submerged arc furnace, a smelter etc. The reducing and smelting furnace may be, for example, one such as that described in commonly-assigned U.S. patent application Ser. No. 13/305,876, WO 2009/131148, or the like.

Thus, the present invention combines the power generation facility with the heating, reducing, and melting furnaces and allows for lignite or sub-bituminous coal to be efficiently converted into metal products that may be easily transported.

The power generating facility benefits from the energy of the waste off gas from the heating, reducing, and/or melting furnace, since the lignite or sub-bituminous coal may be dried and allow for high efficiency power generation.

The heating, reducing, and/or melting furnace benefits by using the distilled carbonaceous material as the reductant and by receiving electrical power from the power generating facility.

In accordance with the present invention, all of the required energy may be supplied by the lignite or sub-bituminous coal. However, in some special cases, such as with smaller scale plants in which heat loss is relatively higher or with lower volatile matter coal or in any case in which higher heat recovery is necessary, much higher efficiency is necessary to achieve the total required energy via the coal alone, otherwise the plant requires another heat source, such as natural gas or electricity supplied from outside the battery limit. In such cases, regenerative burners or a regenerative furnace may also be used. For example, such a regenerative burner can be heated by the hot off gas from the heating, reducing, and/or melting furnace, or the regenerative burner can be heated by a portion of the energy from the distilling system for the lignite, sub-bituminous coal, or the like.

Again, the smelting furnace used in conjunction with the various embodiments of the present invention may be, for example, one such as that described in commonly-assigned U.S. patent application Ser. No. 13/305,876, WO 2009/131148, or the like. This furnace is a non-tilting electric furnace, for example. The furnace is an arc furnace that has a substantially-rectangular cross-sectional shape from above/below, for example. Raw material charging chutes and exhaust gas ducts are connected to/through the top wall of the furnace. Electrodes that function as heaters are inserted through the top wall of the furnace. Preferably, these electrodes are each coupled to an electrode lifting device that is used to introduce the electrodes into/extract the electrodes from the interior portion of the furnace. The raw material charging chutes are provided adjacent to both side walls of the furnace, with the electrodes provided near the centerline of the furnace. Multiple raw material charging chutes and electrodes may be spaced along the length of the furnace. Secondary combustion burners are also inserted through the top wall of the furnace. Multiple exhaust gas ducts and secondary combustion burners may be spaced along the length of the furnace. Preferably, the exhaust gas ducts are disposed closer to the raw material charging chutes than the electrodes in order to prevent oxidizing exhaust gas produced after secondary combustion from flowing towards the electrodes, thereby mitigating damage to the electrodes.

The top wall of the furnace preferably has a step-like configuration or otherwise slopes from the raw material charging chutes to the electrodes on either side. Each step of this step-like configuration includes a substantially-horizontal tread and a substantially-vertical riser. The secondary combustion burners are disposed through the substantially-vertical risers in a substantially-horizontal configuration, such that oxygen-containing gas is effectively injected in proximity to the agglomerate layers. It should be noted that the secondary combustion burners could also be disposed through the substantially-horizontal treads in a substantially-vertical configuration.

The side walls/bottom wall of the furnace, near the centerline and distant from the raw material charging chutes (i.e. distant from the raw material beds), a metal tap hole and a slag tap hole are provided to facilitate the tapping of molten metal and molten slag. It should be noted that the metal tap hole and slag tap hole may be in any desired location in the lower portion of the furnace. These holes may be located in the center of the bottom of the furnace. The electrodes are preferably of a three-phase alternating-current type that has desirable heat efficiency, as is typically used in steel-making electric arc furnaces. As an example, an array of six electrodes may be used, consisting of three pairs of electrodes each of a single phase. The tip portion of each electrode is preferably submerged in the agglomerate layers disposed on the raw material beds, or submerged in the molten slag, while conducting the melting operation. As a result, melting can be accelerated by the effects of radiant heat and resistance heat, and damage to the interior surfaces of the furnace that are not protected by raw material beds can be minimized.

In accordance with the present invention, the lower portion of the furnace includes a plurality of discharge hoppers located at various positions beneath the raw material and agglomerate layers. These discharge hoppers are selectively operated in-process or off-line to discharge a predetermined amount of the raw material (including agglomerates and fines) from the furnace, such that the material flow and position of the melting area in the furnace can be controlled. The discharge operation is carried out using a slide gate and screw conveyor disposed beneath the discharge hoppers. If multiple slide gates are used with each discharge hopper, then material may be discharged from specific portions of the furnace by opening one or more slide gates at a time.

In operation, it is necessary to control the material flow and the position of the melting area in the furnace so that orderly, continuous operation of the furnace can be maintained. Thus, in addition to the use of the discharge hoppers, the raw material charging chutes are equipped with outer chutes including feeding ports that may be telescoped or otherwise adjusted vertically. Each raw material charging chute includes a hopper for storing the raw material, an inner chute connected to the hopper, and an outer chute that can be telescoped or otherwise adjusted vertically on the inner chute. The lower portion of the agglomerate layer may be adjusted to occur at a desired position by moving the outer chutes and feeding ports in a vertical direction, depending on the angle of repose of the agglomerate layer.

Thus, the present invention provides a system and method for adjusting the lower portion of the agglomerate layer regardless of the changing angle of repose and collapse angle of the raw material bed and layer due to the segregation and/or accumulation of fines. Stable material flow from the feeding point to the melting area can be established and maintained for long term operation. This operation, especially when fines are removed from underneath the feeding point, is extremely effective. Even though the agglomerates are screened immediately before entering the feeding hopper, some amount of fines in the furnace is unavoidable. These fines tend to segregate and/or accumulate right at the feeding point. This material is similar in chemistry to the feed material, or is partially reduced. Even if it is partially reduced, it typically has a good balance between oxidant and reductant, and can typically be recycled. One method of recycling the reclaimed material is to simply mix it with new feed material entering the agglomeration equipment, requiring no new equipment. Another method of recycling the reclaimed material is to direct the reclaimed material to a new feed hopper and feed chute located opposite the tapping side of the furnace. Again, the preferable shape of the furnace is rectangular, where the refractory is protected by the DRI feed on two of the four sides. It is difficult to protect the tapping side of the furnace by maintaining a DRI layer because the tapping side of the furnace must have good hot metal and/or slag flow at the tap holes. Therefore, it is desirable to protect the tapping side of the furnace by water cooling. As an alternative, feeding the reclaimed material to this side of the furnace may also protect the refractory and reduce heat loss as compared to water cooling.

If the amount of removed material is too large, then the furnace will need the same amount of pre-reduction area as the two sides for material feed, for example. However, the amount of removed material is much less than the fresh feed and may be partially reduced. So melting the recycled material may be achieved by making a pile on the slag and hot metal layer underneath the new recycle hopper.

One important aspect of this type of electric melting furnace is the generation of foamy slag, which is created, in part, by gas that is evolved from the reduction reaction. Material may be recycled to an area that is adjacent to an electrode (such as between a pair of electrodes), resulting in the generation of CO gas by the reduction reaction and foamy slag. CaO may be added to the recycled material such that good de-sulfurizing performance is achieved. If limestone (CaCO3) or dolomite (CaCO3 and MgCO3) is added to the recycled material instead of CaO, foamy slag may be generated using the resulting CO2. The limestone or dolomite may also be charged to the furnace independent of the recycled material.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for producing direct reduced iron and/or hot metal using high-moisture content carbonaceous material comprising at least 20% moisture by weight, the method comprising:
    drying the high-moisture content carbonaceous material with energy from an off gas from a furnace for producing direct reduced iron and/or hot metal;
    destructively distilling the high-moisture content carbonaceous material;
    dry quenching carbonaceous material obtained from the distilling;
    agglomerating the carbonaceous material from the distilling and the dry quenching with a metal oxide-bearing material to form an agglomerate; and
    using the agglomerate in a direct reduction and/or hot metal producing process.

2. The method of claim 1, further comprising:
    drying the high-moisture content carbonaceous material directly with the off gas from the furnace for producing direct reduced iron and/or hot metal.

3. The method of claim 1, further comprising:
    drying the high-moisture content carbonaceous material indirectly with the off gas from the furnace for producing direct reduced iron and/or hot metal.

4. The method of claim 1, further comprising:
    drying the high-moisture content carbonaceous material with low-oxygen content gas having an oxygen content low enough to prevent combustion of the high-moisture content carbonaceous material.

5. The method of claim 1, further comprising:
    generating power with a portion of the high-moisture content carbonaceous material.

6. The method of claim 5, further comprising:
    drying the high-moisture content carbonaceous material with off gas from a power generation facility.

7. The method of claim 1, further comprising:
    recycling low-oxygen content gas.

8. The method of claim 1, wherein the high-moisture content carbonaceous material comprises one of brown coal, lignite, and sub-bituminous coal.

9. The method of claim 1, further comprising:
    using a gasified portion of the high-moisture content carbonaceous material from the distilling for generating power and using a residual portion of the high-moisture content carbonaceous material as reductant in the direct reduction and/or hot metal producing process.

10. The method of claim 1, wherein the direct reduction and/or hot metal producing process comprises using a reduction and/or melting furnace for producing molten metal from the agglomerates while feeding an oxygen-containing gas from a secondary combustion burner into a furnace interior, thereby causing combustion of carbon monoxide-containing gas generated from an agglomerate layer, and using radiant heat therefrom to effect heating reduction of the agglomerate layer.

* * * * *